3,819,646
(1-METHYL-5-NITRO-2-IMIDAZOLYL)THIO-
ALKANOIC ACIDS AND DERIVATIVES
Robert C. Tweit, Wilmette, Ill., assignor to
G. D. Searle & Co., Chicago, Ill.
No Drawing. Filed Nov. 20, 1972, Ser. No. 308,060
Int. Cl. C07d 49/36
U.S. Cl. 260—309                    8 Claims

ABSTRACT OF THE DISCLOSURE

The compounds of this invention are prepared by the reaction of 2-mercapto-1-methylimidazole with haloalkanoic acids or esters to form 1-methyl-2-imidazolylthioalkanoic acids or esters and subsequent nitration of the 1-methyl-2-imidazolylthioalkanoic acids or esters to form (1-methyl-5-nitro - 2 - imidazolyl)thioalkanoic acids or esters. These thio derivatives are oxidized to the corresponding sulfinyl and sulfonyl derivatives. The compounds of this invention are potent anti-protozoal agents and are angiotensin antagonists.

---

The present invention relates to (1-methyl-5-nitro-2-imidazolyl)thio, sulfinyl, and sulfonyl alkanoic acids and esters of the formula

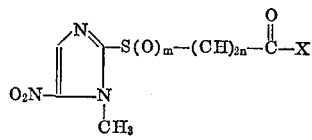

wherein $m$ is an integer from 0 to 2, $n$ is a whole number from 4 to 10, and X is the hydroxyl radical or an alkoxy radical. The alkoxy radical is methoxy or ethoxy. These compounds are prepared as shown in Scheme I.

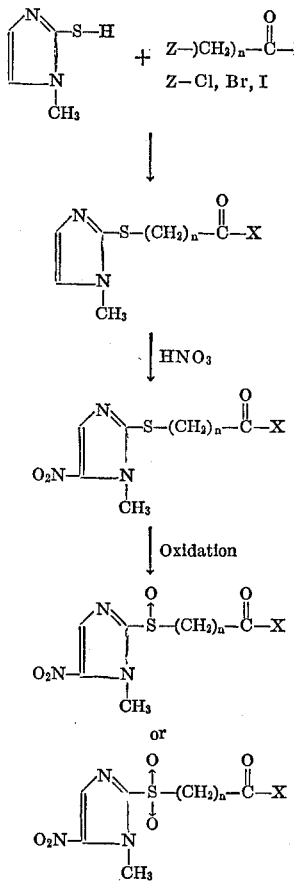

A halo alkanoic acid or ester and 2-mercapto-1-methylimidazole are condensed to form a 1-methyl-2-imidazolylthioalkanoic acid or ester. The latter is converted to a (1-methyl-5-nitro-2-imidazolyl)thioalkanoic acid or ester by nitric acid. The (1-methyl-5-nitro-2-imidazolyl)thioalkanoic acid or ester is converted to (1-methyl-5-nitro-2-imidazolyl)sulfinylalkanoic acid or ester and 1-methyl-5-nitro-2-imidazolylsulfonylalkanoic acid or ester by peracid oxidation. Generally the sulfinyl and sulfonyl derivatives can be products of the same oxidation reaction and they can be subsequently separated.

Thus, 5-chloropentanoic acid is condensed with 2-mercapto-1-methylimidazole in warm 2-propanol to form 5-(1-methyl-2-imidazolyl)thiopentanoic acid. The latter is nitrated by heating in dilute nitric acid and the product, 5-(1-methyl-5-nitro - 2 - imidazolyl)thiopentanoic acid, is precipitated from the acid solution by neutralization. Oxidation of 5-(1-methyl-5-nitro-2-imidazolyl)thiopentanoic acid with m-chloroperbenzoic acid provides 5-(1-methyl-5-nitro-2-imidazolyl)sulfonylpentanoic acid and 5-(1-methyl-5-nitro-2-imidazolyl)sulfinylpentanoic acid. The sulfinyl and sulfonyl derivatives are separated by column chromatography on silica gel.

The compounds of the present invention are useful in view of their anti-microbial and hypotensive activity. They are especially effective in inhibiting the growth of protozoa.

Evidence of the anti-protozoal utility of the present compounds is obtained from standardized tests designed to determine the capacity of test compounds to inhibit the growth of Trichomonas vaginalis. These tests are carried out in the following manner. A modified Diamond medium is prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water. The pH is adjusted to 6.8 with 40% sodium hydroxide solution and 30 parts of agar (Baltimore Biological Laboratories) is incorporated. The mixture is boiled for one minute to dissolve the agar and is then sterilized in an autoclave. To 80 volumes of the resultant medium is aseptically added 20 volumes of sterile Dubos medium serum. The resultant medium is inoculated with 1% by volume of a 72 hour culture of Trichomonas vaginalis, whereupon 1 ml. of the inoculated medium is mixed with 10 mg. of test compound. The mixture is incubated anaerobically at 37° C. for 48 hours and then examined microscopically for the presence of motile trichomonads. If any are observed, the compound is considered inactive. If no motile trichomonads are observed, 0.1 ml. of the incubated mixture is serially diluted and mixed with quantities of the inoculated medium sufficient to produce concentrations of 1000, 100, 10 and 1 micrograms of test compound per ml. and the resulting mixtures are incubated anaerobically as before at 37° C. for 48 hours and then examined microscopically for the presence of motile trichomonads. Controls are provided by concurrent incubation identical with the foregoing except for the absence of test compound.

A standard test for hypotensive activity is that designed to determine whether compounds reverse the vasopressor response to intravenous angiotensin in rats. This response is manifested as a transient increase in mean arterial blood pressure of the test animals, which are preliminarily sensitized to the angiotensin with a ganglioplegic agent in substantial accordance with Pickens et. al., Circ. Res., 17, 438 (1965), and others. Details of the procedure are as follows: Male Charles River rats weighing 180–350 gm. are used. Each animal is anesthetized by intraperitoneal injection of 50 mg./kg.

of sodium pentobarbital, whereupon cardiovascular reflexes are blocked by subcutaneous injection of 3 mg. of atropine sulfate dissolved in 0.3 ml. of aqueous 0.85% sodium chloride and sensitization is then induced by subcutaneous injection of 5 mg. of pentolinium tartrate dissolved in 1 ml. of aqueous 0.85% sodium chloride. The trachea is intubated; and both femoral veins and a femoral artery are cannulated, the latter being connected to a calibrated transducer, amplifier, and recorder. After surgery, 5 mg./kg. of herparin sodium is introduced via one of the venous cannulae as a 2% solution in aqueous 0.85% sodium chloride; and rectal temperature is adjusted to 32° C. by means of a regulator and external heat source. When the animal's blood pressure and temperature have stabilized, 5 consecutive 0.1 ml. doses of angiotensin spaced 3 minutes apart are administered via one of the venous cannulae, followed immediately by a dose of the test compound dissolved or suspended in water q.s. a concentration of 10 mg./ml. and administered via the other venous cannulae. After 15 minutes, the angiotensin dosage is repeated, whereupon the mean response to the precompound treatment with angiotensin is determined and compared with the mean response to the postcompound angiotensin treatment. The compound is considered hypotensive if it significantly ($P \leq 0.05$) decreases the mean response to angiotensin in more than half of the test animals.

The following examples are presented to further illustrate the present invention. They should not be construed as limiting it either in spirit or in scope. In these examples quantities are indicated in parts by weight unless parts by volume are specified, and temperatures are indicated in degrees Centigrade (° C.). The relationship between parts by weight and parts by volume is the same as that existing between grams and milliliters.

EXAMPLE 1

11.4 Parts of 5-chloropentanoic acid and 9.5 parts of 2-mercapto - 1-methylimidazole are dissolved in 2-propanol and heated for 12 hours. The solvent is evaporated and the residue is dissolved in water, neutralized with sodium carbonate and extracted with methylene chloride. The extracts are concentrated and the residue is mixed with 30 parts by volume of nitric acid and 20 parts by volume of water. The solution is heated for 2 hours, diluted with water, and neutralized with sodium carbonate. Upon neutralization a solid separates and this solid is recrystallized from acetone and the product is 5-(1-methyl-5-nitro-2-imidazolyl)thiopentanoic acid, melting at 115–117°. The formula is

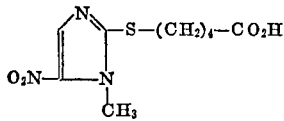

EXAMPLE 2

0.9 Parts of 5-(1-methyl-5-nitro-2-imidazolyl)-thiopentanoic acid and 0.9 parts of m-chloroperbenzoic acid (67.5%) are mixed in 30 parts by volume of chloroform and cooled to 4°. After reacting for 18 hours, the solution is evaporated and the residue is dissolved in benzene and chromatographed on silica gel. The product eluted with 10% ethyl acetate-benzene is 5-(1-methyl-5-nitro-2-imidazolyl)sulfonylpentanoic acid, melting at 141–142°. The formula is

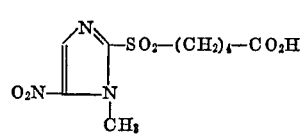

The product eluted with 100% ethyl acetate is 5-(1-methyl-5-nitro-2-imidazolyl)sulfinylpentanoic acid, melting at 85–90°. The formula is

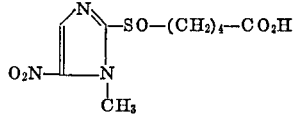

EXAMPLE 3

11.4 Parts of 2-mercapto-1-methylimidazole and 26.5 parts of 11-bromoundecanoic acid are dissolved in 50 parts by volume of 2-propanol and heated for 12 hours. One half of the solvent is removed and crystals are formed on cooling. The crystals are recrystallized from methanol-acetone-benzene and dried to provide 11-(1-methyl-2-imidazolyl)thioundecanoic acid hydrobromide, melting at 104–105°. 31 Parts of the hydrobromide are dissolved in water and neutralized with sodium hydroxide. The free base separates as a solid and is dissolved in 45 parts by volume of nitric acid and 30 parts by volume of water. This solution is heated for 2 hours and cooled. Upon cooling a solid separates and this solid is chromatographed on silica gel. The product eluted with 15% ethyl acetate-benzene is 11-(1-methyl-5-nitro-2-imidazolyl)-thioundecanoic acid, melting at 114.5–115°. The formula

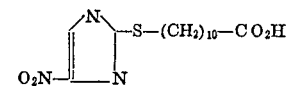

The acid is converted to the ester by heating 2 parts of the acid in 10 parts by volume of methanol in the presence of 0.01 part of p-toluenesulfonic acid for 1 hour. Crystals are formed upon cooling. The product is methyl 11-(1-methyl-5-nitro-2-imidazolyl)thioundecanoate, melting at 80–81°. The formula is

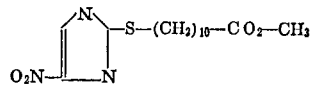

EXAMPLE 4

1.5 Parts of 11-(1-methyl-5-nitro-2-imidazolyl)thiomethylundecanoate is dissolved in 5 parts by volume of chloroform and 1.1 parts of 67.5% m-chloroperbenzoic acid is added. A solid, m-chlorobenzoic acid, is formed, separated, and discarded. The filtrate is washed with $Na_2CO_3$ sol, dried and evaporated. The residue is triturated with ether. The product is methyl 11-(1-methyl-5-nitro-2-imidazolyl)sulfinylundecanoate, melting at 74–76°. The formula is

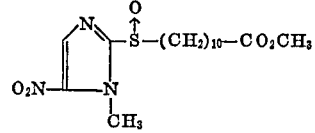

EXAMPLE 5

Treatment of 1.5 parts of methyl 11-(1-methyl-5-nitro-2-imidazolyl)thioundecanoate with 3.15 parts of 67.5% m-chloroperbenzoic as is described in Example 4 gives a residue which is dissolved in benzene and chromatographed on silica gel. The eluate with 5% ethyl acetate-benzene is methyl 11-(1-methyl-5-nitro-2-imidazolyl)-sulfonylundecanoate, melting at 74–78°. The formula is

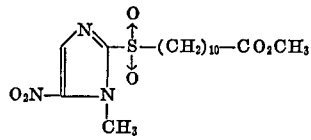

What is claimed is:
1. A compound of the formula

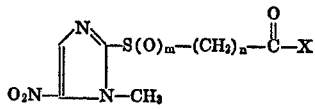

wherein m is an integer from 0 to 2 and n is a whole number from 4 to 10, and X is hydroxyl or lower alkoxy.

2. As in Claim 1, the compound which is 5-(1-methyl-5-nitro-2-imidazolyl)thiopentanoic acid.
3. As in Claim 1, the compound which is 5-(1-methyl-5-nitro-2-imidazolyl)sulfonylpentanoic acid.
4. As in Claim 1, the compound which is 5-(1-methyl-5-nitro-2-imidazolyl)sulfinylpentanoic acid.
5. As in Claim 1, the compound which is 11-(1-methyl-5-nitro-2-imidazolyl)thioundecanoic acid.
6. As in Claim 1, the compound which is methyl 11-(1-methyl-5-nitro-2-imidazolyl)thioundecanoate.
7. As in claim 1, the compound which is methyl 11-(1-methyl-5-nitro-2-imidazolyl)sulfinylundecanoate.
8. As in claim 1, the compound which is methyl 11-(1-methyl-5-nitro-2-imidazolyl)sulfonylundecanoate.

References Cited

UNITED STATES PATENTS

| | | | |
|---|---|---|---|
| 3,341,549 | 9/1967 | Henry | 260—309 |
| 3,499,001 | 3/1970 | Lutz | 260—309 |
| 3,636,003 | 1/1972 | Doebel et al. | 260—309 |
| 3,714,179 | 1/1973 | Tweit | 260—309 |

OTHER REFERENCES

Campaigne et al.: J. Org. Chem., vol. 29, pp. 1715–19 (1964).

Fisher et al.: Can. J. Chem., vol. 39, pp. 785–88 (1961).

NATALIE TROUSOF, Primary Examiner

U.S. Cl. X.R.

424—273